(12) United States Patent
Francois et al.

(10) Patent No.: US 11,672,313 B2
(45) Date of Patent: Jun. 13, 2023

(54) PIECE OF JEWELLERY MADE OF NATURAL ELASTOMER MATERIAL

(71) Applicant: The Swatch Group Research and Development Ltd, Marin (CH)

(72) Inventors: Nicolas Francois, Neuchatel (CH); Julien Dahan, Porrentruy (CH); Gregory Kissling, La Neuveville (CH)

(73) Assignee: The Swatch Group Research and Development Ltd, Marin (CH)

( * ) Notice: Subject to any disclaimer, the term of this patent is extended or adjusted under 35 U.S.C. 154(b) by 499 days.

(21) Appl. No.: 16/831,972

(22) Filed: Mar. 27, 2020

(65) Prior Publication Data
US 2020/0367617 A1    Nov. 26, 2020

(30) Foreign Application Priority Data

May 23, 2019  (EP) .................................... 19176237

(51) Int. Cl.
| | | |
|---|---|---|
| *A44C 27/00* | (2006.01) | |
| *C08L 1/02* | (2006.01) | |
| *C08L 27/18* | (2006.01) | |
| *C08K 3/36* | (2006.01) | |
| *C08K 7/02* | (2006.01) | |

(52) U.S. Cl.
CPC .............. *A44C 27/001* (2013.01); *C08L 1/02* (2013.01); *C08L 27/18* (2013.01); *C08K 3/36* (2013.01); *C08K 7/02* (2013.01)

(58) Field of Classification Search
CPC .. C08L 1/02; C08L 27/18; C08K 3/36; C08K 7/02; A44C 5/0053; A44C 27/001
USPC ........................................................... 63/33
See application file for complete search history.

(56) References Cited

U.S. PATENT DOCUMENTS

| | | |
|---|---|---|
| 2006/0042139 A1 | 3/2006 | Mendes |
| 2007/0219073 A1 | 9/2007 | Mannschedel |
| 2018/0273675 A1 | 9/2018 | Russo et al. |

FOREIGN PATENT DOCUMENTS

| | | | |
|---|---|---|---|
| CH | 711 884 A2 | 6/2017 | |
| CH | 713 127 A1 | 5/2018 | |
| CH | 713 313 A2 | 6/2018 | |
| DE | 198 47 710 A1 | 4/1999 | |
| DE | 19847710 A1 * | 4/1999 | ........... A44C 5/0053 |
| EP | 2 468 127 A1 | 6/2012 | |
| EP | 2468127 A1 * | 6/2012 | ........... A44C 27/001 |
| EP | 3 335 584 A1 | 6/2018 | |
| JP | 7-126436 A | 5/1995 | |
| JP | 2014-042627 A | 3/2014 | |
| JP | 2018-532446 A | 11/2018 | |
| WO | WO-2017036642 A1 * | 3/2017 | ............. A44C 27/00 |

OTHER PUBLICATIONS

Japanese Office Action dated Mar. 30, 2021 in Japanese Patent Application No. 2020-067340 (with English translation), citing document AO therein, 7 pages.
European Search Report dated Nov. 19, 2019 in European Application 19176237.6 filed on May 23, 2019 (with English Translation of Categories of Cited Documents), citing documents AA & AO-AR therein, 4 pages.
Combined Chinese Office Action and Search Report dated Apr. 19, 2022 in Chinese Patent Application No. 202010440336.5, (with English translation of Categories of Cited Documents), citing documents AA, AB, AO-AR and AX therein, 10 pages.
New natural rubber resources on the horizon, China Academic Journal Electronic Publishing House, Aug. 15, 2005, pp. 8-10.

* cited by examiner

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

A piece of jewellery made of a natural elastomer composite material, wherein the natural elastomer composite material includes a natural elastomer matrix wherein between 0% and 6% cellulose fibres, between 0 and 5% anti-odour agents, and between 0 and 30% silica are dispersed.

20 Claims, No Drawings

PIECE OF JEWELLERY MADE OF NATURAL ELASTOMER MATERIAL

CROSS-REFERENCE TO RELATED APPLICATION

This application claims priority to European Patent Application No. 19176237.6 filed on May 23, 2019, the entire disclosure of which is hereby incorporated herein by reference.

FIELD OF THE INVENTION

The present invention relates to the technical field of elastomer-based materials. More specifically, the invention relates to a piece of jewellery made using a natural elastomer material, a method for manufacturing said pieces, and said pieces obtained.

In the present invention, the term 'piece of jewellery' denotes any ornamental object, as well as components used in the horology or jewellery fields. More particularly, the invention relates to bracelets, such as watch bracelets.

BACKGROUND OF THE INVENTION

Numerous elastomer materials are commercially available and are known to be used as bracelets, for example due to the high comfort, supple feel and resistance thereof.

For example, the patent EP 2 468 127 discloses a piece of jewellery that is at least partly made of a composite material comprising an elastomer matrix in which reinforcing fillers are disposed, which fillers are selected from the group comprising microfibres, polytetrafluoroethylene nanoparticles, and mixtures thereof, said composite material being obtained from a composition comprising between 60 wt % and 95 wt % of at least one elastomer, between 0 wt % and 5 wt % of microfibres and between 0 wt % and 40 wt % of polytetrafluoroethylene nanoparticles, with respect to the total weight of the composition, at least one of said reinforcing fillers being present.

However, these elastomer materials used for bracelets or horological components in contact with the skin are based on components of which 90% or more are derived from fossil resources, which does not satisfy current environmental concerns.

In order to satisfy these environmental concerns, alternatives exist such as natural elastomers. However, the latter contain a combination of highly allergenic proteins and natural elastomers free of these allergens should thus be used. Such elastomers are, for example, proposed by Yulex Corp.

Although free of allergens, this type of natural elastomer suffers from certain drawbacks as regards the production of parts that provide sufficient comfort to the wearer. More specifically, this type of natural elastomer has a strong smell as a result of the rubber and the vulcanisation method, and is also not very resistant to fouling and not very pleasant when in contact with the skin.

SUMMARY OF THE INVENTION

The purpose of the invention is in particular to overcome the different drawbacks of these known techniques.

More specifically, one purpose of the invention is to provide a piece of jewellery made of a natural elastomer material that is intended to be in extended contact with the skin (either directly or indirectly), and to obtain a natural elastomer material having a limited or zero impact on the environment, while having properties that help eliminate perspiration and that have good resistance to ageing (UV, perspiration, aesthetics, tearing, abrasion, etc.).

These purposes, in addition to others that will appear more clearly hereafter, are achieved, according to the invention, by using a piece of jewellery made of a natural elastomer composite material, said natural elastomer composite material comprising a natural elastomer matrix in which between 0% and 6% cellulose fibres, between 0 and 5% anti-odour agents, and between 0 and 30% silica are dispersed.

According to other advantageous alternative embodiments of the invention:
 the natural elastomer is deproteinised natural rubber;
 the elastomer material comprises a fluorinated elastomer in the proportion of between 5 and 20%;
 the elastomer composite material comprises short cellulose fibres and long cellulose fibres, the length of the cellulose fibres lying in the range 0.5 mm to 1.5 mm;
 the elastomer material comprises least between 5 and 10% of a dye additive;
 the elastomer material comprises least between 0 and 2% polytetrafluoroethylene;
 the natural elastomer material comprises at least one release agent.

The invention further and in particular relates to any timepiece made of a natural elastomer material according to the invention.

The invention further relates to a method for manufacturing a piece of jewellery in accordance with the invention, the manufacturing method comprising the following steps of:
 producing a composition comprising at least one natural elastomer and between 0 and 30% silica;
 adding antiozonant and antioxidant agents;
 adding between 0 and 6% cellulose fibres, and between 0 and 5% anti-odour agents;
 adding a fluorinated elastomer in the proportion of 5 to 20%;
 moulding parts from the composition obtained in the previous step;
 curing the castings obtained for 2 hours at 120° C.; and
 carrying out finishing steps for the casting obtained.

Other features and advantages of the invention will be better understood upon reading the following description given of a specific embodiment of the invention, provided for illustration purposes and not intended to limit the scope of the invention.

DETAILED DESCRIPTION OF THE PREFERRED EMBODIMENTS

The invention relates to a piece of jewellery made of a natural elastomer composite material, characterised in that the natural elastomer composite material comprises a natural elastomer matrix in which between 0% and 6% cellulose fibres, between 0 and 5% anti-odour agents, and between 0 and 30% silica are dispersed.

According to the invention, the natural elastomer material selected for the matrix is a hypoallergenic natural rubber, such as that manufactured by Yulex Corp. The quantity of natural elastomer is equal to 100 wt % with respect to the total weight of the composition.

The hardness of the elastomer material can be selected from a range of 20 shore 00 to 90 shore D depending on the haptic and functional needs.

Hard elements of a case can be produced by moulding with hardnesses of 90 shore D, for example, whereas shore 00 and shore A materials are instead used as a coating on a hard element. Flexible parts such as the bracelets will be made with a shore A hardness.

For example, in the case of a watch case, the elastomer can be sprayed on the surface of the case and act as a coating, or it can be cast moulded to procure a soft touch.

According to one advantageous aspect of the invention, the rubber naturally has antibacterial properties (the latex derived from the rubber tree contains sesquiterpenes which are natural biocides) limiting, or even preventing the development of bacteria on the surface and within the material, essentially as a result of the perspiration of the wearer when the bracelet is in contact with the skin for example.

The elastomer material further comprises an anti-odour agent such as zeolite for example (Lithofill MM) so as to absorb odours, this agent generally being present in grain form having a grain size of 0 to 10 μm. Depending on the needs, the quantity of anti-odour agent lies in the range 0 to 5%. According to one alternative embodiment of the invention, the zeolite acts as a support for diffusing a fragrance, which zeolite can, for example, receive one or more essential oils or even one or more perfumes. Such an embodiment is particularly interesting given the fact that the zeolite allows the fragrance to be diffused over a very long period of time.

The natural elastomer material further comprises a reinforcing agent such as silica so as to improve the durability thereof and resistance thereof to wear, the quantity of silica present lying in the range 0% to 30%.

According to the invention, the elastomer material comprises hydrophilic microfibres arranged so as to evacuate moisture, and in particular perspiration, through the elastomer material. In accordance with the present invention, the hydrophilic microfibres have a fineness of less than 150 mTex, which is a sufficient size to allow same to carry $H_2O$-type molecules.

According to the invention, the hydrophilic fibres are made of a cellulose material, and fibres of the Lyocell type will preferably be used such as Tencel FCP by Lenzing.

Preferably, the composition according to the invention comprises between 0% and 6% microfibres with respect to the total weight of the composition. The microfibres used have a length that lies in the range 0.5 mm to 1.5 mm.

The presence of these microfibres in the material allows a network of microscopic channels to be formed, and the nanofibrils forming the microfibres quickly and evenly carry the moisture through the material.

In order to improve the carriage of moisture through the material, the microfibres incorporated into the material are formed of short cellulose microfibres and of long cellulose microfibres, the length of the cellulose fibres lying in the range 0.5 mm to 1.5 mm.

Such a mixture of short microfibres and long microfibres cause the microfibres to touch and form channels improving the diffusing power of the matrix formed by the elastomer material and the moisture can be carried by capillarity through the material and thus be evacuated at the surface.

According to the invention, the microfibres preferentially have a helix-shaped cross-section giving them a larger specific surface area and thus a faster diffusion power.

More specifically, the section of the hydrophilic fibres is helix-shaped with n blades, where n is strictly greater than two, so as to provide a larger specific surface area and thus promote moisture evacuation.

The composition comprises vulcanisation agents specific to the elastomer, and other conventional additives commonly used by a person skilled in the art in the field of rubber-based formulations. Peroxides are, for example, vulcanisation agents commonly used for rubber. The composition further comprises a vulcanisation accelerator and a vulcanisation retarder, respectively present in the proportions of 8% and 0.5%.

Advantageously, the composition can comprise a dye or a pigment. Mixtures of dyes and/or of pigments can also be used.

The composition further comprises antiozonant agents and antioxidant agents in order to protect the natural rubber from ageing, the latter being respectively present in the proportion of 1%.

In order to improve the colour of the rubber, titanium dioxide is used to counterbalance the yellow colour of the natural rubber and thus obtain a white colour composition, the quantity of titanium dioxide used lying in the range 5 to 10%. It goes without saying that other dyes, preferably natural, can be added to obtain the desired colour.

A fluoroelastomer of the transparent FKM type is also added in the proportion of 20% in order to improve the composition's resistance to fouling and improve the flexibility of the end product.

According to one embodiment of the invention, polytetrafluoroethylene (PTFE) is also added in the proportion of 0 to 2%, and more specifically in the proportion of 1.84% to the material in order to improve the feel. A softer feel is thus obtained on contact with the skin.

The material described hereinabove can be directly moulded in order to produce single-material bracelet strands having a natural elastomer base, or even moulded from a casting to produce bi-material bracelet strands, each strand having a first lower part made of a natural material in contact with the skin, and an upper part made of another material that is advantageous with respect to the function thereof. Each of the parts can also conceivably have a different colour on purely aesthetic grounds.

Example compositions are described hereinbelow, each whereof comprising a base which forms the elastomer matrix in which the additives are dispersed. These examples are based on specimens produced by the applicant in accordance with the invention.

| Ingredients | YUL 16 | YUL 17 |
| --- | --- | --- |
| Yulex Pure | 100 | 100 |
| Stearic acid | 0 | 0 |
| Zinc oxide | 3 | 0 |
| Peroxide | 4 | 4 |
| Antioxidant | 1 | 1 |
| Antiozonant | 1 | 1 |
| Accelerator | 8 | 8 |
| Retarder | 0.5 | 0.5 |
| Cellulose fibre | 6 | 6 |
| Precipitated silica 180 +/− 20 $m^2/g$ | 30 | 30 |
| $TiO_2$ | 10 | 5 |
| Kaolin/clay | 2 | 0 |
| Zeolite | 5 | 5 |
| FKM | 20 | 20 |
| PTFE | 0 | 1.84 |

The piece of jewellery made of elastomer composite material according to the invention is obtained by a method comprising the following steps of:

producing a composition comprising at least one natural elastomer and between 0 and 30% silica;

adding antiozonant and antioxidant agents;
adding between 0 and 6% cellulose fibres, and between 0 and 5% anti-odour agents;
adding a fluorinated elastomer in the proportion of 5 to 20%;
moulding or cast moulding parts from the composition obtained in the previous step;
curing the moulded or cast moulded parts obtained for 2 hours at 120° C.; and
carrying out finishing steps for the casting obtained.

Depending on the needs of the person skilled in the art and the parts to be produced, the finishing steps for the casting can consist of sewing, printing a pattern, or producing holes in the material, etc.

The moulding of the composition can be carried out by any method known by a person skilled in the art, such as injection moulding, or by compression moulding.

Vulcanisation is carried out in a known manner at a temperature that generally lies in the range 10° C. to 200° C., for a sufficient duration that can vary depending on the part desired, for example between 60 and 380 seconds as a function of the vulcanisation temperature, the vulcanisation system adopted and the vulcanisation kinetics of the composition.

The piece of jewellery can, for example, be a bracelet, in particular a watch bracelet. More specifically, a bracelet according to the invention can have specific shapes and cuts and nonetheless meet strict specifications in terms of mechanical strength, and more specifically in terms of tensile strength and resistance to fouling, while procuring good evacuation of the wearer's sweat.

Such a natural material allows for the manufacture of timepieces or jewellery such as bracelets, bracelet buckles, necklaces, cases, case backs, push pieces, buckles or even bezels.

It goes without saying that the present invention is not limited to the example shown and that various alternatives and modifications that may be apparent to a person skilled in the art can be made thereto.

The invention claimed is:

1. A piece of jewelry made of a natural elastomer composite material, wherein the natural elastomer composite material comprises a matrix of a natural elastomer material, in which greater than 0% to 6% by weight of cellulose fibres, greater than 0% to 5% by weight of an anti-odour agent, and greater than 0% to 30% by weight of silica, with respect to a total weight of the natural elastomer composite material, are dispersed, and
the cellulose fibres comprise short cellulose fibres and long cellulose fibres, the length of the cellulose fibres lying in a range of from 0.5 mm to 1.5 mm.

2. The piece of jewelry according to claim 1, wherein the natural elastomer material is a rubber.

3. The piece of jewelry according to claim 1, wherein the natural elastomer composite material further comprises a fluorinated elastomer in a proportion of between 5 and 20% by weight, with respect to the total weight of the natural elastomer composite material.

4. The piece of jewelry according to claim 1, wherein the natural elastomer composite material further comprises between 5 and 10% la weight of a dye additive, with respect to the total weight of the natural elastomer composite material.

5. The piece of jewelry according to claim 1, wherein the anti-odour agent is zeolite.

6. The piece of jewelry according to claim 5, wherein the zeolite forms a support for diffusing a fragrance or an odour, the zeolite being able to receive at least one essential oil, and/or at least one perfume.

7. The piece of jewelry according to claim 1, wherein the natural elastomer composite material further comprises between 0 and 2% weight of polytetrafluoroethylene, with respect to the total weight of the natural elastomer composite material.

8. The piece of jewelry according to claim 1, wherein the natural elastomer composite material comprises at least one release agent.

9. A method for manufacturing a piece of jewelry according to claim 1, said method comprising:
producing a composition comprising at least one natural elastomer material and between 0 and 30% by weight of silica;
adding antiozonant and antioxidant agents to the composition;
adding between 0 and 6% by weight of cellulose fibres, and between 0 and 5% la weight of an anti-odour agent to the composition;
adding a fluorinated elastomer to the composition in a proportion of 20% la weight;
moulding parts from the composition;
curing the moulded parts for 2 hours at 120° C.; and
carrying out a finishing process for the cured moulded parts.

10. The method according to claim 9, wherein the elastomer is a rubber.

11. The method according to claim 9, wherein the composition comprises at least one dye additive.

12. The method according to claim 9, wherein the composition comprises at least one release agent.

13. The piece of jewelry according to claim 1, wherein the cellulose fibres have a helix-shaped cross-section.

14. The piece of jewelry according to claim 1, which is a bracelet consisting of the natural elastomer composite material.

15. The piece of jewelry according to claim 1, which is a bracelet comprising a lower part consisting of the natural elastomer composite material and an upper part made of a material different from the natural elastomer composite material, wherein the lower part is configured to directly contact with the skin of a wearer of the bracelet.

16. The piece of jewelry according to claim 1, wherein the cellulose fibres comprise lyocell.

17. The piece of jewelry according to claim 1, wherein the natural elastomer composite material further comprises 5 to 10% by weight of titanium dioxide.

18. The piece of jewelry according to claim 1, wherein the natural elastomer composite material is vulcanized.

19. The piece of jewelry according to claim 1, wherein the cellulose fibres have a fineness of less than 150 mTex.

20. The piece of jewelry according to claim 1, wherein the natural elastomer composite material comprises 6% by weight of the cellulose fibres, 5% by weight of the anti-odour agent, and 30% by weight of the silica, with respect to the total weight of the natural elastomer composite material, dispersed in the matrix of the natural elastomer material.

* * * * *